G. T. JOHNSON.
SAW GUARD.
APPLICATION FILED NOV. 30, 1917.
1,271,473. Patented July 2, 1918.
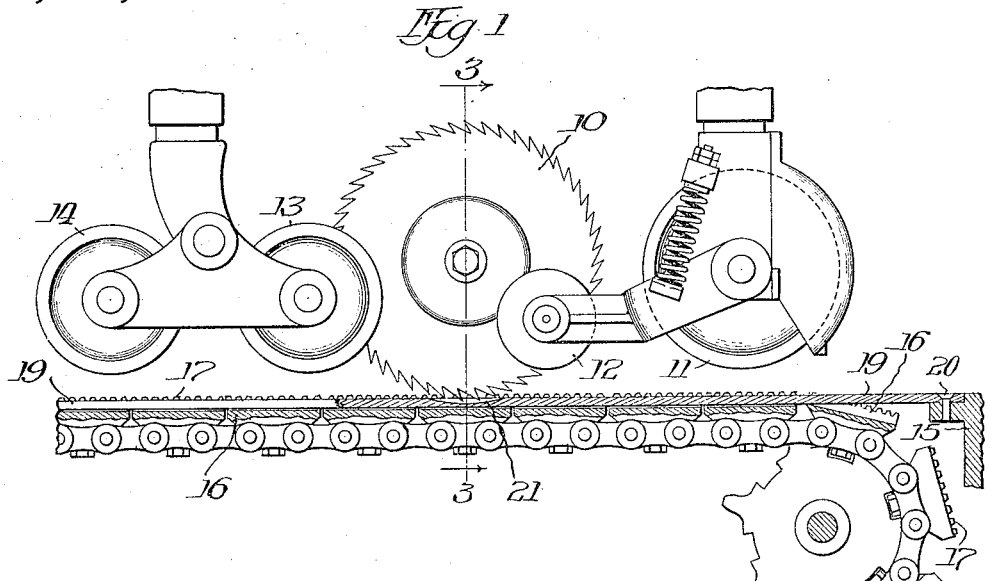
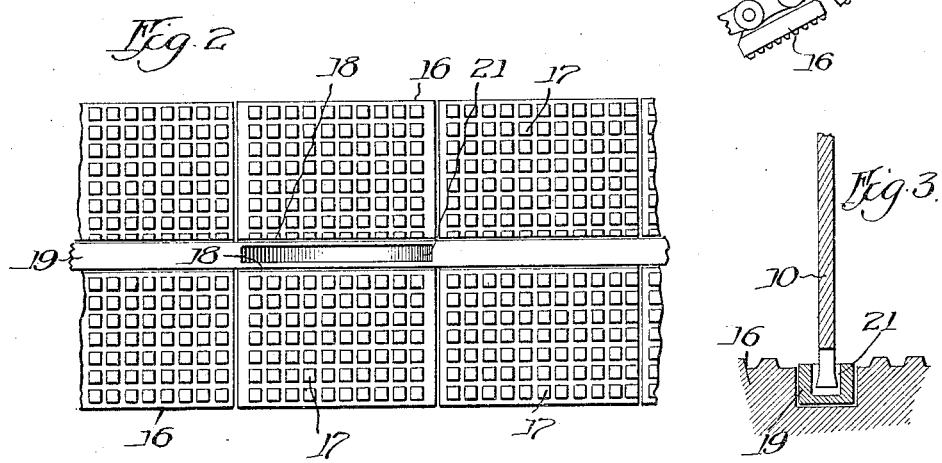
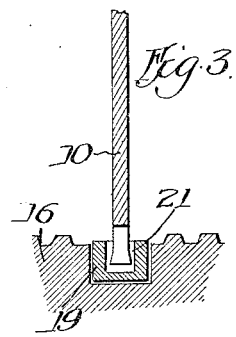
Witness:
Inventor
Gustave T. Johnson
By Walter M. Fuller
Atty

UNITED STATES PATENT OFFICE.

GUSTAVE T. JOHNSON, OF BELOIT, WISCONSIN, ASSIGNOR TO P. B. YATES MACHINE COMPANY, OF BELOIT, WISCONSIN, A CORPORATION OF WISCONSIN.

SAW-GUARD.

1,271,473.

Specification of Letters Patent.

Patented July 2, 1918.

Application filed November 30, 1917. Serial No. 204,582.

*To all whom it may concern:*

Be it known that I, GUSTAVE T. JOHNSON, a subject of the King of Sweden, residing at Beloit, in the county of Rock and State of Wisconsin, have invented certain new and useful Improvements in Saw-Guards, of which the following is a specification.

My invention pertains to improvements in safety or guard means for preventing narrow edgings, slivers, and thin pieces of stock removed from boards by a saw located above a longitudinally-grooved traveling-bed or endless feed-chain, associated with the usual table, from coming into contact with the saw teeth by reason of falling into such bed or chain groove, which, as is usual, is provided to permit the saw to cut completely through the stock. An occurrence of this kind is dangerous, since the rapidly-revolving saw teeth may shoot out or kick back the strips with considerable speed and force to the possible injury of the attendant of the machine. It is desirable, therefore, to block, fill, or guard the moving bed or chain groove, preferably in such manner that the device can be used with rip saws, for example, of various dimensions, without requiring change, modification, or adjustment, and in such a way that no part of the groove-closing means shall project above the surface of the traveling-bed.

A further object of the invention is the provision of an appliance or attachment of this character, which shall be simple in its structure, economical to produce, unlikely to become damaged or injured in service, which may be readily applied to or removed from the machine, and which will in no way interfere with the operation of the saw with which it is associated.

The preferred embodiment of the invention comprises a straight bar occupying the longitudinal groove of the endless traveling-bed, but not projecting above its upper active surface, and supported at its opposite ends only on the main table in any approved and simple manner. In order to accommodate the teeth of the saw which project into the groove of the feed-chain, this bar is recessed or grooved, but preferably only at that place where the saw is located. Such bar or strip, therefore, constitutes a stationary filler piece or strip in the groove of the traveling-bed or endless-chain, preventing the small pieces of stock from falling into the groove of the chain where they might possibly come in contact with the rapidly-revolving saw-teeth and be projected from the machine with more or less violence and possible injury to any one near by.

In order that those skilled in this art may have a full and complete understanding of this invention and its various features of novelty and improvement, both from structural and functional standpoints, I have illustrated a desirable embodiment of the invention in the accompanying drawing, throughout the various views of which like reference characters refer to the same parts.

In this drawing:

Figure 1 is a fragmentary elevation, with some of the parts in section, showing the improvement applied to a sawing appliance of ordinary construction;

Fig. 2 is a fragmentary plan view on an enlarged scale of a portion of the traveling-bed or endless-chain, and that part of the filler-bar or guard directly beneath the saw showing the groove or recess in the bar which accommodates the lower teeth of the saw, and Fig. 3 is a fragmentary enlarged vertical cross-section on line 3—3 of Fig. 1.

Referring to the drawing, the saw appliance, such as a rip saw, includes the usual circular saw 10 and its accompanying front and rear pressure-rollers 11, 12, 13, and 14, and, as is customary, the device includes a table 15 longitudinally recessed or cut away beneath the saw and its rollers for the accommodation of the usual, endless, traveling feed bed or chain 16, each element or link member of which has a roughened outer or upper face 17 centrally longitudinally grooved at 18 for the reception of the lower teeth of the saw, thus permitting the latter to cut entirely through the board riding on the bed by which it is fed forwardly and against which it is pressed by the rollers. Located in this lengthwise groove composed of a series of relatively-short alined grooves in the plurality of feeding bed elements 16, is a straight filler-bar or guard 19 rectangular in cross-section and supported only at its two ends in any approved manner, as by screws 20 fastening it to the table 15, only one of these supports being shown in the drawing. (Fig. 1). This bar or filler-strip 19, which is shown partially broken in Fig. 1, is of slightly less dimension in cross-section than the corresponding dimension of the groove in which it is received, so that, whereas such bar is maintained stationary, the traveling-bed, or feed-chain elements may move along out of contact therewith, thus avoiding friction. As is shown in all of the figures of the drawing, this bar, filler-piece, or guard just beneath the saw 10, is recessed or milled out at 21 for the accommodation of the extreme lower portion of the saw, and, if desired, this groove, or cavity may be of varying depth so that its bottom may conform in a general way to the lower curvature of the saw-teeth.

It will be appreciated, therefore, that owing to the fact that the groove in the traveling-bed is occupied, filled, or guarded by this bar, narrow pieces of board or edgings cut off by the saw are prevented from falling into the groove and coming into contact with the rapidly-rotating teeth, and hence, such pieces are prevented from being forcibly projected along the bed and from the machine, possibly to the injury of anyone standing in the path of their travel. In other words, such narrow or thin pieces are carried along by the bed and properly discharged without retrograde movement by the action of the saw itself. If the part of the board removed by the saw is of sufficient thickness to engage both the bed and the pressure-rolls, there would be no danger of its falling into the groove of the bed with the injurious results indicated, but the improved means herein set forth constitutes a sort of safety appliance or guard to prevent thin pieces which do not engage both the bed and the rollers from being kicked back and projected from the machine in the manner specified.

It should be observed that the improved and novel guard or filler is of the simplest construction and easy and inexpensive to make, that it is supported and maintained in place on the table and in proper association with the bed or feed chain by simple means, that the use of the guard in no way interferes with the operation of the saw, and that the saw may be changed or adjusted without requiring the removal or any adjustment of the guard.

The invention is not limited and restricted to the precise and exact details of construction presented, because these may be varied within comparatively wide limits without departure from the substance and essence of the invention and without the sacrifice of any of its substantial benefits and advantages.

I claim:

1. In a sawing appliance of the character described, the combination of a longitudinally-grooved endless traveling bed, a saw above and adapted to project into the groove of said bed, and a filler-piece in said groove supported at its two ends only and adapted to prevent narrow pieces of stock from entering the groove and coming into contact with the saw-teeth, substantially as described.

2. In a sawing appliance of the character described, the combination of a recessed table, a longitudinally-grooved endless traveling-bed operating in said recess, a saw above and adapted to project into the groove of said bed, and a filler-piece in said groove supported at its opposite ends only on said table and adapted to prevent narrow pieces of stock from entering the bed groove and coming into contact with the saw-teeth, substantially as described.

3. In a sawing appliance of the character described, the combination of a recessed table, a longitudinally-grooved endless traveling-bed operating in the recess of said table, a saw above and adapted to project into the groove of said bed, and a filler-piece in said groove, supported at its two ends only on said table, adapted to prevent narrow pieces of stock from entering the groove and coming into contact with the saw teeth, and located wholly below the active surface of said bed, substantially as described.

4. In a sawing appliance of the character described, the combination of a recessed table, a longitudinally-grooved endless traveling-bed operating in said recess, a saw above and adapted to project into the groove of said bed, and a straight filler-bar, recessed for the accommodation of the saw-teeth, located in said groove, supported at its two ends only on said table, beyond said traveling bed, disposed entirely below the active surface of the bed, and adapted to prevent narrow pieces of stock from entering the bed groove and coming into contact with the saw-teeth, substantially as described.

GUSTAVE T. JOHNSON.